Aug. 25, 1936.   A. W. PAULL   2,052,191
MANUFACTURE OF COLLAPSIBLE TUBES
Filed June 25, 1934
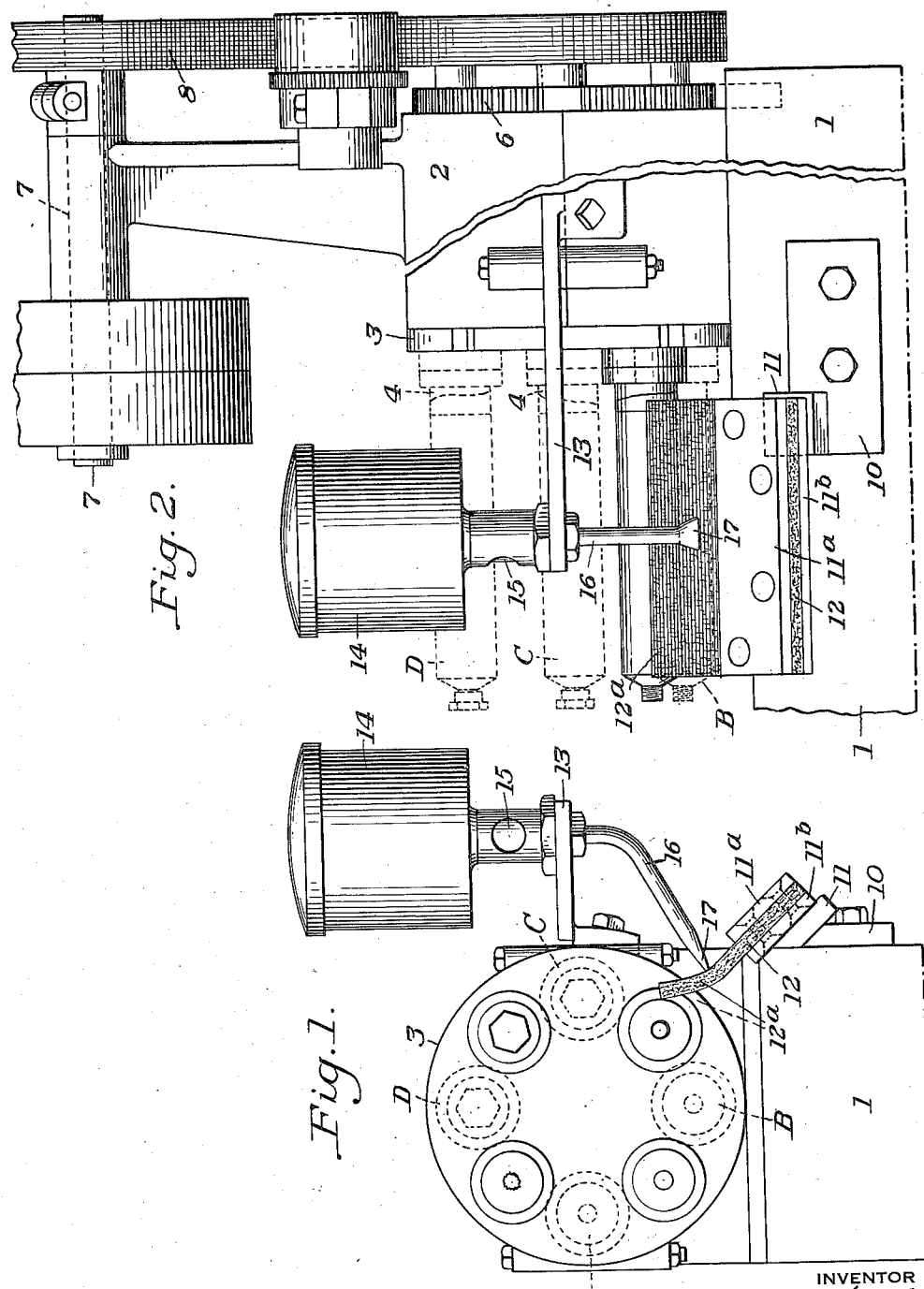

Patented Aug. 25, 1936

2,052,191

UNITED STATES PATENT OFFICE 2,052,191

MANUFACTURE OF COLLAPSIBLE TUBES

Archibald W. Paull, Wheeling, W. Va., assignor to Wheeling Stamping Company, Wheeling, W. Va., a corporation of West Virginia Application June 25, 1934, Serial No. 732,219

2 Claims. (Cl. 29—38)

This invention relates to the manufacture of collapsible tubes, and more particularly to the manufacture of collapsible tubes wherein the formed tube is to receive a coating of paint or enamel.

The ordinary collapsible tube such as is commonly used for tooth paste, shaving cream and other pharmaceutical preparations, is usually formed of tin or aluminum. The tube is usually formed from a slug of metal on an extrusion press. After it has been formed, the neck of the tube is threaded, the neck end of the tube is trimmed, a screw cap is applied to the neck and the tubes are cut to uniform length. When these operations have been performed, the tube is ready to be coated with paint or enamel in such color or colors as a particular manufacturer may require. The cost at which the tubes are sold is such that the number of handling operations shall be kept as low as possible. At the same time, the users of the tubes require a high degree of perfection in the manner in which the tube is colored or decorated. The coloring must be absolutely uniform. It must adhere to the body of the metal. Sample tubes are tested by the purchaser to determine how uniformly and how thoroughly the decoration is applied to the tube.

In the manufacture of the tubes, certain surface impurities form or collect on the surface of the tubes. This may be a very thin film of grease either from the machinery or from the hands of the operator, or may be from some other source, possibly inherent in the metal itself. Where this surface impurity forms, the tube will not be uniformly coated, or the coating will not adhere to the body of the tube as firmly as it should, or possibly will not spread onto that surface of the tube where the impurity is present at all. This, of course, cannot be determined until the tube has been run through the coating machine, and after it has been run through the coating machine, it is otherwise complete and ready for shipment. Consequently where a tube is imperfectly coated because of the presence of this surface impurity, it has to be discarded. Any tube so discarded is one which has gone through the full or practically the full process of manufacture, and it is important that as few tubes as possible be discarded, especially at this stage of their manufacture.

The tubes themselves are of a very frail structure, and any handling of the tubes is very likely to dent them or bend them. This in itself constitutes a considerable hazard to any attempt to treat the tubes in bulk to remove the surface impurities therefrom. According to the present invention, the tubes are individually cleaned, but the cleaning is effected in conjunction with other operations on the tube and while the tube is rigidly supported from the inside on a mandrel, so that it cannot be damaged by the cleaning operation. Moreover, the invention contemplates an arrangement whereby the cleaning can be done without additional labor or handling.

According to the preferred embodiment of the invention, a wiper is provided in the path of a spindle, the spindle being a spindle or mandrel which is adapted to receive and support the tube and which is rotated as the mandrel moves past the wiper. This wiper is supplied with cleaning fluid from a reservoir. As the spindle carrying a tube moves past the wiper, the spindle is revolved and the surface of the tube is wiped clean by the wiper.

The invention may be readily understood by reference to the accompanying drawing which illustrates one embodiment of my invention, and in which—

Figure 1 represents a front elevation of the turret of a tube trimming and capping machine having the tube cleaning arrangement applied thereto; and Figure 2 is a side elevation of a portion of the turret and driving mechanism of the tube trimming and capping machine, the view being a side elevation of the mechanism shown in Figure 1, certain additional portions of the drive being illustrated.

The particular trimming and capping machine illustrated in the drawing is generally similar to that disclosed in Davis Patent No. 1,678,463 dated July 24, 1928, and I have illustrated only so much of the trimming and capping machine in the present drawing that is necessary to an understanding of my invention. The various threading, trimming, cutting off and cap applying mechanisms have not been illustrated, the general arrangement of these being well known and understood by those skilled in the art.

The ordinary tube trimming and capping machine comprises a frame 1 having a head 2 which supports a rotatable turret 3. This turret is intermittently driven in a step-by-step manner through an intermittent gearing, such as a Geneva gear mechanism within the head 2. The turret carries a number of horizontally extending spindles 4. These spindles are successively moved through the operation of the turret through a number of stations where different operations are performed. Each spindle is connected with a common driving gear so that it is rotated during the operation of the machine. A system of planetary gears generally indicated at 6 is provided for this purpose.

In the drawing I have illustrated the machine as having a driving shaft 7 with a belt 8 through which the operation of the turret and of the individual spindles is effected. All of this mechanism, as previously stated, is disclosed in the said Davis patent and is known to those skilled in the art.

Referring to Figure 1, the letter A indicates the position to which the spindles are progressively moved and where the tubes are applied to the spindles. At position B the neck of the tube is threaded, the neck end of the tube is trimmed, and the other end of the tube is cut to the proper length. At position C the cap is applied to the tube, and at position D the tube is removed. Other machines which are commercially available may have a greater number of positions for the turret and for the spindles.

According to the present invention, a bracket 10 is secured to the frame of the machine. This bracket has a horizontal portion 11 having upper and lower plates 11a and 11b between which is secured a wiper 12. The wiper 12 comprises a heavy piece of felt or other fibrous material. It has a free edge portion 12a that projects up into the path of travel of the spindles on the turret. This wiper ordinarily assumes the dotted line position shown in Figure 1, but when a spindle carrying a tube on its surface moves from the position B to the position C, the wiper is flexed to the position shown in Figure 1. In this position the wiper bears against the tube throughout the full length of the tube, thereby wiping the surface of the tube.

The invention contemplates the provision of means for supplying cleaning fluid to the wiper. In the illustrated form of the invention a bracket 13 is secured to the side of the head 2, and on this bracket is mounted a reservoir 14 for the cleaning fluid. The reservoir 14 may comprise an ordinary sight feed lubricator cup, the sight feed being indicated at 15. Leading from the bottom of the sight feed is a tube 16 having a discharge spout 17 terminating against the wiper 12. The fluid drops at a predetermined rate from the reservoir into the tube 16 and discharges onto the wiper 12, keeping the wiper at a predetermined degree of saturation. The fluid in the reservoir 14 may be replenished from time to time as may be necessary.

In the operation of these trimming and capping machines, the spindle is rotated at a relatively high degree of speed at station B. This rotation is continued as the spindle moves from position B to position C and is also continued in position C. It will thus appear that while the spindle is passing the wiper, the tube is being rotated by means of the spindle at a relatively high speed. Because of this fact the entire periphery of the tube is wiped in the short interval in which the wiper is in engagement with the tube. The wiping action which is thus obtained is sufficient to remove the surface impurities, so that practically all of the tubes will properly take the decoration or coating. The cleaning of the tube does not require any separate manual operation, because it is done intermediate other processing steps on the tube and while the tube is supported on the spindle. Since the tubes are supported on the spindles, they cannot collapse, and the cleaning device therefore does not mutilate the tubes in any way. After being cleaned and otherwise completed, the tubes are enameled or coated in the usual way.

The application of the wiper to trimming machines has resulted in reducing the number of tubes which are defective because of the coating not being uniform, to a very considerable extent and has improved the uniformity of the coating on the tubes. The amount of cleaning fluid required is very slight, so that the invention results in tubes being cleaned at a negligible cost, without additional handling and without hazarding the bending or deformation of the tubes.

While I have illustrated my invention as being applied to a particular form of trimming and capping machine, it will be understood that this is merely by way of illustration, and that my improvement may be otherwise embodied within the contemplation of my invention and under the scope of the following claims.

I claim:

1. The combination with a tube machine having a plurality of spindles and means for moving the spindles successively past a number of positions, of means at one point in the path of travel of the spindles for wiping the surface of tubes supported on the spindles, said means comprising a felt wiper the length of which is coextensive with the length of the body of the tube, and a rigid support for the wiper.

2. The combination with a tube trimming and capping machine having a plurality of spindles movable progressively from one position to another and having means for operating on the tubes at different stations, of a holder supported by said machine, and a wiper carried on said holder, said wiper having a tube engaging portion adapted to be deflected by movement of the spindles past the wiper whereby said wiper will bear against the surface of tubes supported on the spindles.

ARCHIBALD W. PAULL.